United States Patent [19]

McNelley

[11] Patent Number: 5,092,304

[45] Date of Patent: * Mar. 3, 1992

[54] MOUNTED FUEL TANK HEATER

[76] Inventor: Jerald R. McNelley, Rte. 2, Box 172, Benton, Tenn. 37307

[*] Notice: The portion of the term of this patent subsequent to May 22, 2007 has been disclaimed.

[21] Appl. No.: 495,778

[22] Filed: Mar. 19, 1990

Related U.S. Application Data

[63] Continuation-in-part of Ser. No. 306,641, Feb. 3, 1989, Pat. No. 4,926,830.

[51] Int. Cl.$^5$ .................... F02M 53/00; F02M 31/16; F02N 17/02
[52] U.S. Cl. ............................. 123/557; 123/142.5 R; 123/549; 165/51; 165/41; 165/74; 165/142
[58] Field of Search ..................... 123/557, 142.5, 549; 165/35, 51, 41, 74, 142

[56] References Cited

U.S. PATENT DOCUMENTS 4,684,786 8/1987 Mann et al. .......................... 123/557
4,748,960 6/1988 Wolf ..................................... 123/557
4,865,005 9/1989 Griffith ................................ 123/557

FOREIGN PATENT DOCUMENTS

WO89/07791 8/1989 World Int. Prop. O. ............ 165/35

Primary Examiner—John Ford
Attorney, Agent, or Firm—Pitts and Brittian

[57] ABSTRACT

A system (10) for preheating fuel in a fuel tank (16) for an internal combustion engine. The system (10) includes a heat exchanger (12) for transferring heat from a heated fluid to the fuel. The heat exchanger (12) includes a fuel tube (32) being surrounded by the heated fluid for further heating of the fuel prior to its entering the fuel line of the vehicle or other device in which the system is installed. In the preferred embodiment, the heat exchanger (12) is installed through an access opening (14) normally provided in fuel tanks used in diesel engine-powered over-the-road trucks. A flange (18) is provided for securing the heat exchanger (12) to the flange (20) which surrounds the opening (14) in the fuel tank (16).

6 Claims, 4 Drawing Sheets

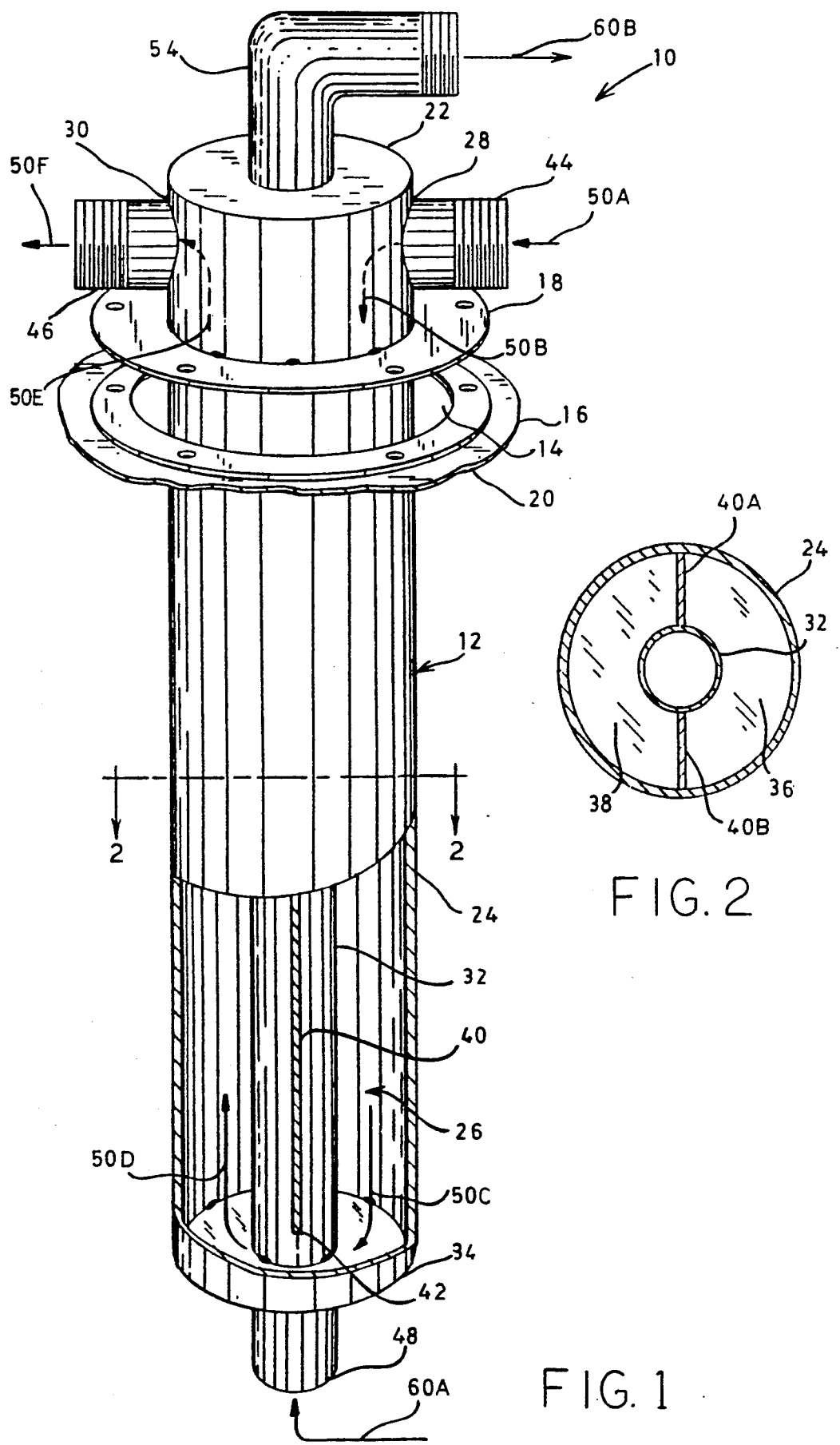

MOUNTED FUEL TANK HEATER

DESCRIPTION

This is a continuation-in-part application based upon application Ser. No. 7/306,641, filed Feb. 3, 1989, now U.S. Pat. No. 4,926,830 issued May 22, 1990.

1. Technical Field

This invention relates to a system for preheating fuel for an internal combustion engine in the fuel tank normally provided with a vehicle or other machine powered by such engine.

2. Background Art

It is well known that preheating the fuel used in an internal combustion engine improves the efficiency of the engine. Further, preheating the fuel typically used in a diesel engine can avoid serious fuel flow problems well known to occur in cold weather environments.

Diesel fuel, and in particular the No. 2 fuel oil typically burned by the engines of over-the-road trucks, can congeal or "wax" in the cold weather regularly experienced during the winter months in the northern states of the United States and in Canada. The jelling or waxing of fuel can shut a diesel engine down, necessitating the towing of the vehicle to a repair facility where the fuel tank must be heated to alleviate the problem. The expense of towing and downtime can be substantial.

A number of methods and devices have been developed in an attempt to solve the problem of congealing fuel oil in cold weather. One method has been to install a heater in the fuel line. U.S. Pat. No. 3,929,187 discloses a device which utilizes this method. However, this method does not solve the problem of fuel oil congealing within the fuel tank itself before it even gets into the fuel line. Another method is to install a heater in the fuel tank. U.S. Pat. No. 4,237,850 discloses a device which utilizes this second method. The device disclosed in this patent has two primary disadvantages. One, while the fuel can be heated in the tank to a temperature above that at which it "waxes", it is not necessarily heated to a temperature which will prevent it from congealing in the fuel line in extremely cold weather, because of the volume of fuel which must be heated in the tank which is usually directly exposed to the cold outside air temperatures. Second, the device disclosed in this patent requires an access opening which must be cut/formed into the top of the fuel tank prior to installation of the device.

Therefore, it is a principal object of the present invention to provide a system for preheating diesel fuel in the fuel tank to a temperature above that at which the fuel would normally congeal.

It is a further object of the present invention to provide a system for preheating the diesel fuel leaving the fuel tank to a temperature which is sufficiently higher than the temperature at which the fuel would normally congeal such that the fuel cannot jell in the fuel line between the fuel tank and the diesel engine to which it is supplied.

It is yet another object of the present invention to provide a system for preheating the fuel in the fuel tank of a diesel engine-powered vehicle or machine which includes a heat exchanger which can be installed through and secured in the opening normally provided in such a fuel tank for the installation of a fuel level gauge.

It is another object of the present to provide such a diesel fuel tank heater in a form designed to present a low profile and occupy the minimum amount of space exterior of the fuel tank.

DISCLOSURE OF THE INVENTION

Other objects and advantages will be accomplished by the present invention which provides a system for preheating fuel for an internal combustion engine in the fuel tank normally provided with the vehicle or other device powered by such engine. The system includes a heat exchanger which is installed in the fuel tank of the vehicle or other device. In the preferred embodiment, the heat exchanger is installed through and secured to the opening normally provided in the fuel tanks of most diesel engine-powered over-the-road trucks for installation of a fuel gauge. Most such trucks are provided with two fuel tanks and the fuel gauge access opening is usually only used for a fuel gauge in one of the tanks. Therefore the unused opening in one of the tanks can be used for installation of the present invention.

In the preferred embodiment, the heat exchanger is an elongated substantially cylindrically shaped device made of a thermally conductive material, preferably a corrosion-resistant metal. The heat exchanger includes a heated fluid chamber and a fuel tube, ending in a ninety degree elbow, extending through such chamber. The heated fluid chamber includes an inlet port and an outlet port positioned in a first end portion of the heat exchanger. A divider plate is provided in the heated fluid chamber between the inlet and outlet port which extends from the first end portion of the chamber through all but a small portion of the length of the chamber. The divider plate divides the heated fluid chamber into an inlet section and an outlet section whereby heated fluid from an external source enters through the inlet port and travels through the inlet section toward the second end portion of the chamber where it passes into the outlet section and travels back toward the first end portion where it exits through the outlet port and is returned to the external source for reheating. Heat is transferred through the external walls of the heat exchanger from the heated fluid to the fuel in the fuel tank.

As indicated above, a fuel tube with a ninety degree elbow termination is provided which extends through, and is therefore surrounded by, the heated fluid chamber. In the preferred embodiment, fuel is drawn into an open fuel inlet end of the tube proximate and external to the second end portion of the heat exchanger, and is drawn through the fuel tube where it is further heated by the heated fluid in the above-described chamber which surrounds the fuel tube, and exits from the fuel outlet ninety degree elbow end of the tube which is connected to the fuel line of the vehicle in which the present invention is installed, proximate and external to the first end portion of the heat exchanger.

In the preferred embodiment, the external source of heated fluid is the radiator of the vehicle in which the present invention is installed. Fluid communication can be provided between the radiator and the inlet and outlet ports of the above-described heated fluid chamber via flexible hoses similar to those normally used in internal combustion engines to provide fluid communication between the radiator and the engine block. In another embodiment of the present invention, the heated fluid can comprise lubricating oil circulated from the oil pan of the engine with which the system is used.

Fuel is drawn from the fuel tank through the ninety degree elbow end of the fuel tube of the present invention into the fuel line as described above by the fuel pump of the engine of the vehicle or other device in which the system is installed.

BRIEF DESCRIPTION OF THE DRAWINGS

FIG. 1 illustrates a perspective view, partially cut away, of a system for preheating fuel for an internal combustion engine in a fuel tank constructed in accordance with various features of the present invention.

FIG. 2 illustrates a top view in section of the heat exchanger, taken at 2—2 of FIG. 1, of a system for preheating fuel for an internal combustion engine constructed in accordance with various features of the present invention.

BEST MODE FOR CARRYING OUT THE INVENTION

Figure 3:
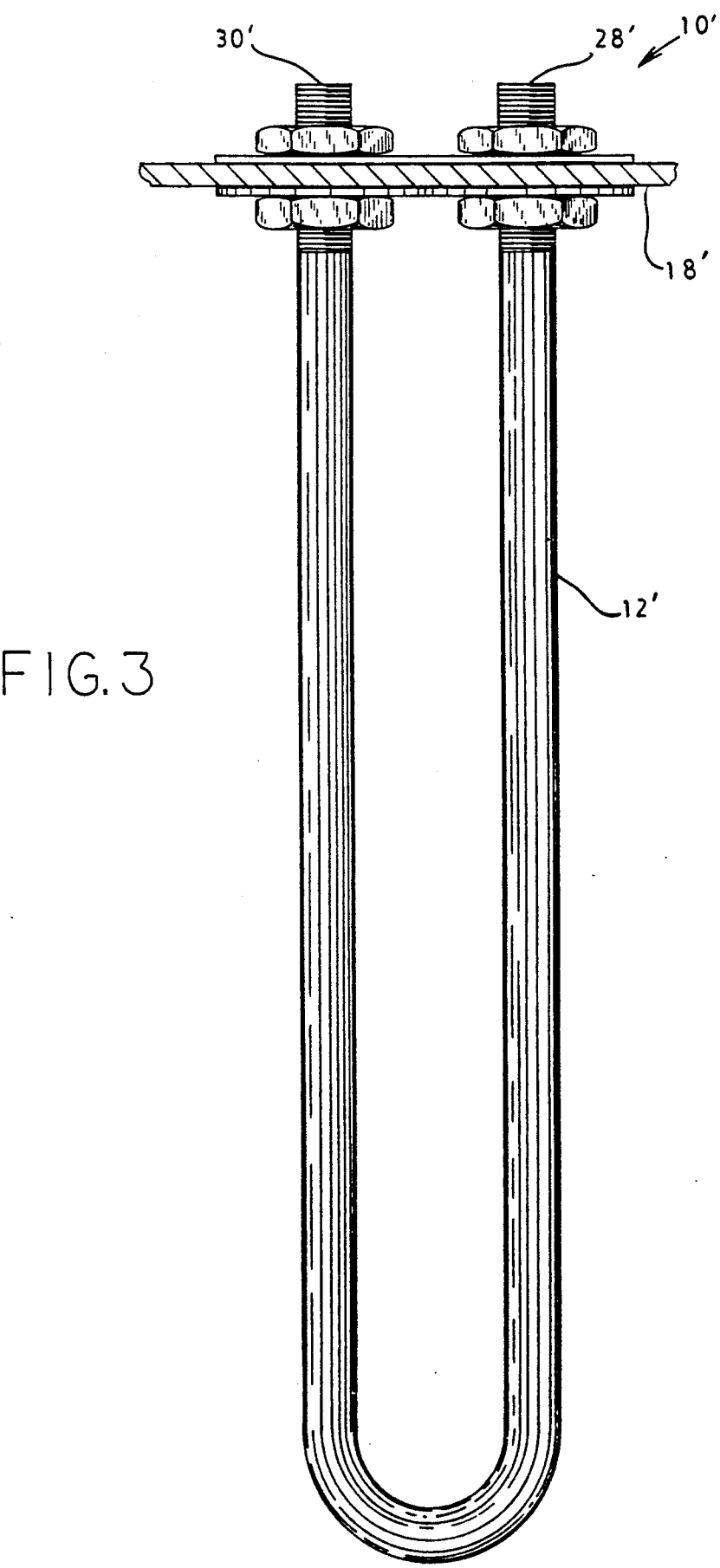
FIG. 3 illustrates a front elevation view of an alternate embodiment of a system for preheating fuel for an internal combustion engine in a fuel tank constructed in accordance with various features of the present invention.

A system for preheating fuel for an internal combustion engine in the fuel tank normally provided with the vehicle or other device powered by such engine is illustrated generally at 10 in FIG. 1. The system includes a heat exchanger shown generally at 12 in FIG. 1. The heat exchanger 12 is installed through an access opening 14 which is normally provided in fuel tanks for diesel engine-powered over-the-road trucks for installation of a fuel gauge. A portion of such a fuel tank is illustrated at 16 in FIG. 1. The heat exchanger 12 is provided with a flange 18, which is dimensioned and predrilled to match the flange 20 surrounding the opening 14 in the fuel tank 16, proximate a first end portion 22 of the heat exchanger 12. When the system 10 is installed, an appropriate gasket or seal (not shown) is installed between the flange 18 and the flange 20.

The heat exchanger 12 comprises a substantially cylindrical vessel having an outer wall 24 which defines an interior heated fluid chamber 26. An inlet port 28 and an outlet port 30 are provided proximate the first end portion 22 of the heat exchanger 12, between the first end portion 22 and the flange 18, through which a heated fluid is supplied from and returned to an external source of the heated fluid. A fuel tube 32 extends axially through the heat exchanger 12 from externally of its second end portion 34 to externally of its first end portion 22. The fuel tube 32 is surrounded by the heated fluid chamber 26 as shown in FIGS. 1 and 2. The heated fluid chamber 26 is divided into an inlet section 36 and an outlet section 38, as illustrated in FIG. 2, by a divider plate 40, comprised of two coplanar plate sections 40A and 40B positioned between the fuel tube 32 and the outer wall 24 of the heat exchanger 12. The divider plate 40 extends from the first end portion 22 of the heat exchanger 12, parallel to the fuel tube 32, for all but a small portion of the length of the heat exchanger 12 where it terminates in a distal end portion 42, such that fluid communication is provided between the inlet section 36 and the outlet section 38 of the heated fluid chamber 26 proximate the second end portion 34 of the heat exchanger.

Figure 4:
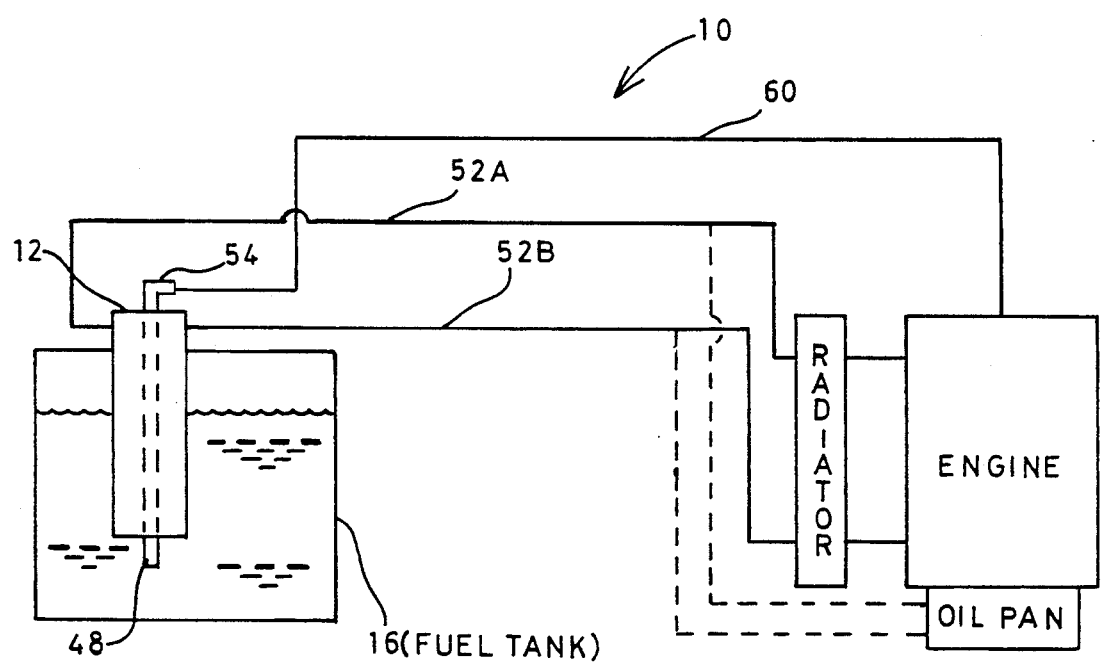
FIG. 4 illustrates a block diagram of a system for preheating fuel for an internal combustion engine in a fuel tank constructed in accordance with various features of the present invention as illustrated in FIGS. 1 and 2.

Referring to FIG. 1 and to FIG. 4, which is a block diagram of the system 10, it can be seen that heated fluid enters via an appropriate fitting 44 into the inlet port 28 of the heat exchanger 12, as indicated by the arrows 50A and 50B. The heated fluid travels down through the inlet section 36 of the heated fluid chamber 26 and under the distal end portion 42 of the divider plate 40 into the outlet section 38 of the heated fluid, chamber 26, as indicated by the arrows 50B, 50C, and 50D. The heated fluid exits the outlet section 38 of the chamber 26 through the outlet port 30 via an appropriate fitting 46, as indicated by the arrows 50E and 50F. It will be appreciated by those skilled in the art that heat from the heated fluid will be transferred to the fuel in the fuel tank which surrounds the heat exchanger 12, which preferably is constructed of a corrosion-resistant metal which has good thermal conductivity. In the preferred embodiment, the heated fluid comprises heated coolant supplied from and returned to the radiator of the vehicle or other device in which the system 10 is installed as illustrated by the block diagram illustrated by FIG. 4. It will be appreciated by those skilled in the art that fluid communication can be provided between the radiator and the inlet and outlet port fittings, 44 and 46 respectively, by hoses, indicated by the reference numerals 52A and 52B in FIG. 4, similar to those typically used between a radiator and the block of an internal combustion engine. Also, as indicated with dashed lines in FIG. 4, the hoses 52A and 52B could be alternatively connected to the oil pan of the internal combustion engine for the circulation of lubricating oil as the heated fluid for the heating of the fuel.

Still referring to FIGS. 1 and 4, it can be seen that fuel from the fuel tank enters the fuel tube 32 through the open fuel inlet end 48 of the tube 32, as indicated by the arrow 60A, and exits through the fuel outlet ninety degree elbow end 54 of the tube 32, proximate and externally of the first end portion 22 of the heat exchanger 12, as indicated by the arrow 60B. The ninety degree elbow outlet end 54 of the fuel tube 32 communicates with the fuel line, indicated by the line 60 in the block diagram illustrated in FIG. 4, which supplies fuel to the engine. It will be appreciated by those skilled in the art that the fuel entering the fuel line will have been further heated in the fuel tube 32 by the heated fluid in the chamber 26 which surrounds the tube 32.

Referring to FIG. 3, an alternate embodiment 10' of the system of the present invention is illustrated. In the system 10', the heat exchanger 12' comprises a U-shaped tube secured proximate its inlet and outlet openings, 28' and 30', respectively, to a flange 18' which may be secured to a fuel tank 16 in a manner similar to that described for the system 10 illustrated in FIGS. 1, 2, and 4.

Figure 5:
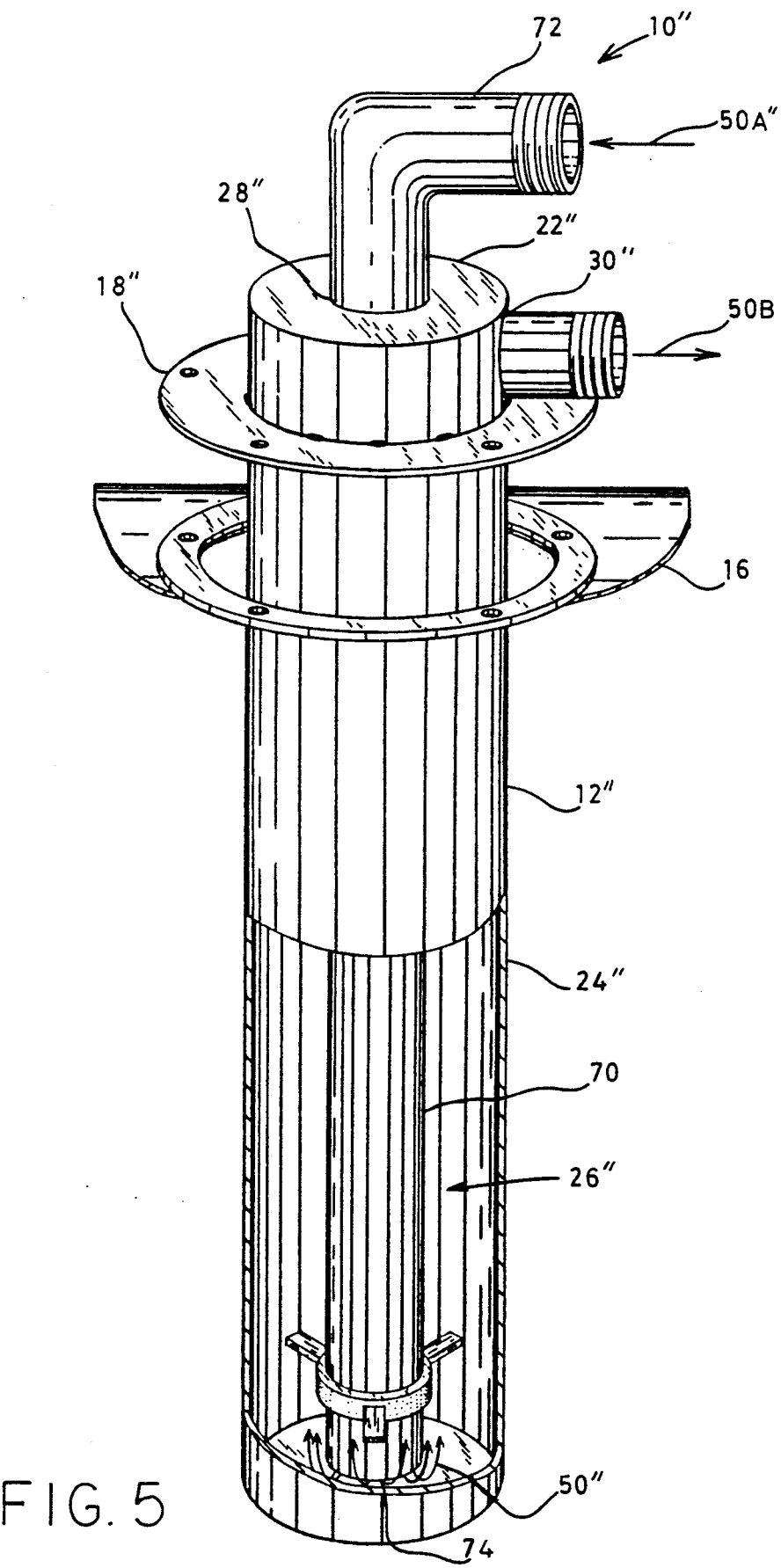
FIG. 5 illustrates a perspective view, partially cut away, of another embodiment of a system for preheating fuel for an internal combustion engine in accordance with various features of the present invention.

At 10" of FIG. 5, another alternate embodiment of the system of the present invention is illustrated. In the system 10", the heat exchanger 12" comprises an elongated substantially cylindrical vessel having a similar overall external appearance to the heat exchanger 12 of the system 10 illustrated in FIG. 1. However, in this embodiment, there is no fuel tube extending through the heat exchanger 12" as in the system 10; in this system 10'', fuel is drawn from the bottom of the fuel tank in the conventional manner, i.e., fuel line connections in the vehicle or other device in which the system is used are left undisturbed. The heat exchanger 12'' defines a heated fluid chamber 26'' and includes a heated fluid inlet port 28'' positioned coaxially with the longitudinal axis of the heat exchanger 12'' in the first end portion 22'' of the heat exchanger. A heated fluid inlet tube 70 is provided which extends coaxially through the heat exchanger 12'' from a ninety degree elbow inlet end 72, positioned externally of and proximate the first end portion 22'' of the heat exchanger 12'', through the inlet port 28'', to an open outlet end 74 positioned within the heated fluid chamber 26'' proximate the second end portion 34'' of the heat exchanger, such that heated fluid in the inlet tube 70 flows into the heated fluid chamber 26'', as indicated by the arrows 50''. In this embodiment, heated fluid from an external source (as described above for the system 10) enters the ninety degree elbow inlet end 72 of the inlet tube 70, flows down through the tube 70 and out of the outlet end 74 into the chamber 26'' proximate the second end portion 34'' of the heat exchanger 12'', and back toward the first end portion 22'' of the heat exchanger where it exits through the outlet port 30'', as indicated by the arrows 50A'', 50'', and 50B''. The heat exchanger 12'' includes a flange 18'' which may be secured to a fuel tank 16 in a manner similar to that described for the system 10 illustrated in FIG. 1. It will be appreciated by those skilled in the art that, because of the flow path of the heated fluid, the greatest heat transfer from the heated fluid to the fuel in the fuel tank will occur near the second end portion 34'' of the heat exchanger 12''. Since the heat exchanger is installed through an opening normally provided in the top portion of the fuel tank, the second end portion 34'' of the heat exchanger will be positioned near the bottom of the fuel tank from which fuel is drawn into the fuel line. Therefore, heating of the fuel entering the fuel line is enhanced. This embodiment of the present invention also has the advantage of having improved heat transfer characteristics over prior art systems which utilize a U-shaped tube heat exchanger similar to that shown in the system 10' illustrated in FIG. 3. Heat transfer from the heated fluid to the fuel in the fuel tank is increased because of the relatively large surface area provided by the external walls 24 of the heat exchanger 12'' as compared to the U-shaped tube devices.

The right angle or ninety degree elbow feature 54 of fuel tube 32, or 72 of heated fluid tube 70, of the above-described heat exchanger embodiments 12 or 12'', instead of ending in a straight fitting that extends at a right angle to the heated fluid inlet ports 44 or 30'', provides a fuel hose connection point which is parallel with that of the heated fluid hoses and inlet ports 44 and 30''. This elbow joint provision allows connecting hoses to be more conveniently attached and consume less space within the confines of the host vehicle. By providing the invention with fuel tube 32 already formed into an elbow joint, the necessity for later attachment of a ninety degree adapter, with attendant possibilities for leakage, is eliminated.

In light of the foregoing, it can be seen that a system 10 is provided by the present invention for preheating the fuel for an internal combustion engine in the fuel tank 16 by a heat exchanger 12 installed through an access opening 14 in the fuel tank. Heat from a heated fluid which is supplied to the heat exchanger 12, as indicated by the arrows 50, is transferred to the fuel in the fuel tank 16. The fuel is further heated by the heated fluid as it is drawn through the fuel tube 32 into the fuel line 60.

Accordingly, when the system 10 is installed in a vehicle or other device powered by an internal combustion engine, the efficiency of such engine will be improved. In particular, the system 10 will eliminate or minimize the problem of congealing or "waxing" of diesel fuel in a diesel engine-powered vehicle or other device operated in cold weather environments.

While a preferred embodiment has been shown and described, it will be understood that it is not intended to limit the invention to such disclosure, but rather it is intended to cover all modifications and alternate constructions falling within the scope of the invention as defined in the appended claims.

I claim:

1. A system for preheating fuel for an internal combustion engine having a fuel line comprising:

a fuel tank for storing fuel to be supplied to said fuel line, said tank having an access opening provided in an upper portion thereof;

an elongated heat exchanger installed through and secured to said access opening, a substantial portion of said heat exchanger being contained within said fuel tank;

said heat exchanger defining an inlet port and an outlet port proximate a first end portion of said heat exchanger positioned externally of said fuel tank;

a heated fluid chamber defined by said heat exchanger communicating between said inlet and outlet ports, said heated fluid chamber including a divider plate which separates said heated fluid chamber into an inlet section communicating with said inlet port and an outlet section communicating with said outlet port, said divider plate being positioned such that a heated fluid entering said inlet port flows toward a second end portion of said heat exchanger where said heated fluid flows through said outlet section of said heated fluid chamber and exits through said outlet port;

a source of said heated fluid;

means for providing fluid communication between said source of heated fluid and said inlet and outlet ports of said heat exchanger;

said heat exchanger further comprising a fuel tube passing substantially axially through said heated fluid chamber and forming a portion of said divider plate, said fuel tube having a fuel inlet end positioned externally of said heated fluid chamber proximate said second end portion of said heat exchanger in fluid communication with said fuel in said fuel tank, and said fuel tube having a fuel outlet end with a ninety degree elbow positioned externally of said heated fluid chamber proximate said first end portion of said heat exchanger in fluid communication with said fuel line of said internal combustion engine;

whereby said heat exchanger exhibits a low profile and occupies a minimal amount of space external of said fuel tank;

whereby said fuel in said fuel tank is heated by heat transferred from heated fluid contained within said heated fluid chamber through the walls of said heat exchanger; and whereby fuel drawn from said fuel tank through said fuel tube into said fuel line is further heated by heat transferred from heated fluid contained by said heated fluid chamber which surrounds said fuel tube.

2. The system of claim 1 wherein said source of heated fluid comprises a radiator containing a coolant which communicates with a block of said internal combustion engine for cooling said engine.

3. The system of claim 1 wherein said source of heated fluid comprises an oil pan of said internal combustion engine.

4. A system for preheating fuel for an internal combustion engine of a vehicle having a fuel line, said vehicle being equipped with a fuel tank for storing fuel to be supplied to said fuel line, said fuel tank provided with an access opening in an upper portion thereof, which comprises:

an elongated shell member defining an exterior surface of a heat exchanger, said shell member installed through and secured to said access opening with a first substantial portion of said shell member disposed within said fuel tank and a second portion disposed exterior said fuel tank, said shell member provided with an inlet port and an outlet port in said second portion exterior said fuel tank, said shell member having a lengthwise axis;

a top closure for said second portion of said shell member exterior to said fuel tank;

a bottom closure for said first portion of said shell member;

a fuel tube mounted axially within said shell member, said fuel tube extending through and sealed to said top and bottom closures of said shell member, said fuel tube having an open first end proximate said bottom closure, said open first end having communication with said fuel tank, and an open second end formed into a bend of substantially ninety degrees from the body of said fuel tube proximate said top closure for connection with said fuel line;

a pair of oppositely disposed divider plates disposed axially within said shell member extending from said top closure to a distal end positioned near said bottom closure, said divider plates attached to and extending radially to said fuel tube and further attached to said top closure, said divider plates forming an inlet portion within said shell member communicating with said inlet port and an outlet portion within said shell member communicating with said outlet port, said inlet portion and said outlet portion joined at said distal end of said divider plates;

a source of heated fluid; and means for providing fluid communication between said source of heated fluid and said inlet and outlet ports of said shell member whereby said heated fluid flows into said shell member through said inlet port into said inlet portion, through said outlet portion and out through said outlet port to thereby transfer heat from said heated fluid to fuel in said fuel tank, and whereby said heated fluid flowing through said shell member transfers heat into fuel flowing through said fuel tube from said fuel tank to said fuel line.

5. The system of claim 4 wherein said source of heated fluid comprises a radiator containing a coolant which communicates with a block of said internal combustion engine for cooling said engine.

6. The system of claim 4 wherein said source of heated fluid comprises an oil pan of said internal combustion engine.

* * * * *